Oct. 12, 1926.
W. V. SMITH
WHEEL RIM LOCK
Filed April 10, 1925
1,603,218
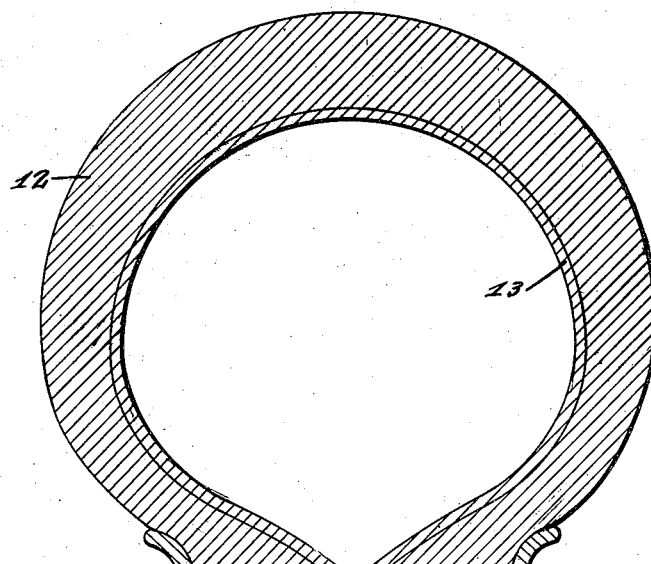
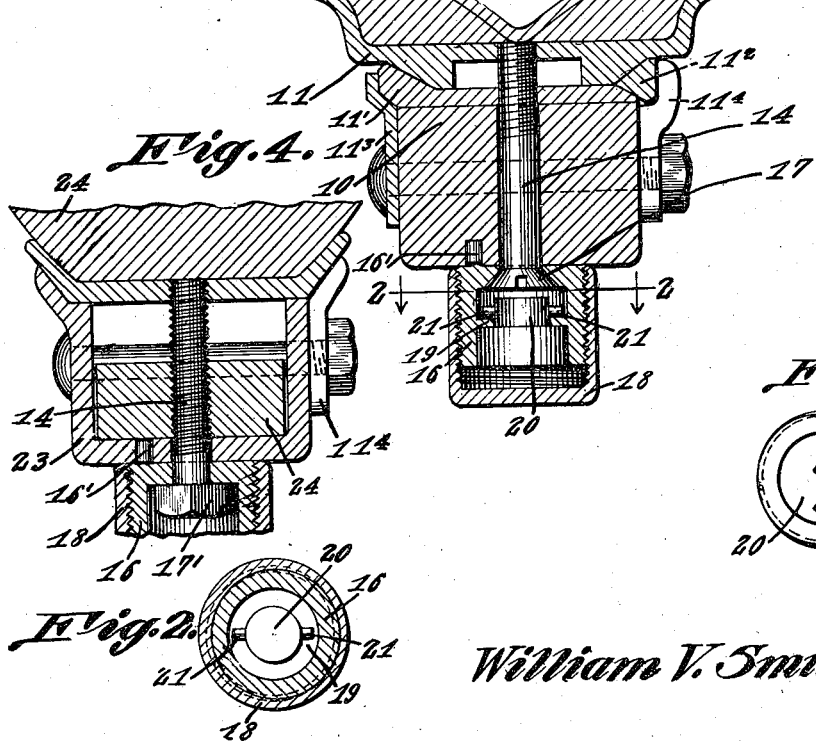
William V. Smith, INVENTOR.
BY Geo. F. Kimmel, ATTORNEY.

Patented Oct. 12, 1926.

1,603,218

UNITED STATES PATENT OFFICE.

WILLIAM V. SMITH, OF JACKSONVILLE, FLORIDA.

WHEEL-RIM LOCK.

Application filed April 10, 1925. Serial No. 22,177.

This invention relates to the wheels of motor driven vehicles of the class having demountable rims and tires, and has for one of its objects to provide a simply constructed device whereby the rim may be locked to the felloe of the wheel to prevent its surreptitious detachment.

With these and other objects in view, the invention consists in certain novel features of construction as hereinafter shown and described and then specifically pointed out in the claim, and in the drawings illustrative of the preferred embodiment of the invention.

Figure 1 is a transverse section of a felloe, a demountable rim, and the tire of a wheel, with the improvement applied, and partly in section.

Figure 2 is a transverse section on the line 2—2 of Figure 1, looking in the direction of the arrow.

Figure 3 is a plan view of the lock portion of the device.

Figure 4 is a sectional detail illustrating the improved device applied to a wheel having a hollow or channel shaped felloe.

The improved device may be adapted without material structural change to any of the various construction of wheels, in which demountable rims are employed, and with felloes of various forms, but for the purpose of illustration is shown applied to conventional forms of such structures, in which 10 represents the cross section of an ordinary wood felloe, 11 the cross section of a conventional demountable rim, 11¹ the felloe band, 11² the clamping ring, 11³ the washer, and 11⁴ one of the clamp clips, these parts being of the usual construction.

The improved device includes a bolt 14 extending through the felloe and threaded into the rim 11.

Bearing upon the inner face of the felloe 10 or 23 is a substantially cup shaped shell or socket 16 open at the outer end. The outer terminal of the stock 14 is preferably formed with a square head as shown at 17' in Figure 4 of the drawing to receive a socket wrench inserted through the outer end of the shell, but may be formed in conical shape and slotted to receive a screw driven, as shown at 17 in Figure 1. The shell is formed with a small stud or spur 16' to enter the felloe 10 or 23 and operative to hold the shell from rotation relative to the felloe.

A dust cap 18 is applied to the shell 16, to protect the latter and its contents from dust, mud and the elements.

Formed on the interior of the shell 16 is an annular flange 19, as shown. The bolt 14 being threaded into the rim may be detached and the rim released by inserting a suitable turning implement through the open outer side of the shell.

To prevent the bolt 14 from being thus released by unauthorized persons, a lock device is provided to be inserted in the shell, this lock device including a casing or shell 20 having oppositely directed bolts 21 adapted to be projected over the flange 19, as shown in Figure 1, by a suitable key inserted through a key hole indicated at 22.

The specific construction of the lock device is not shown, as it forms no part of the present invention.

The device is applied before the tire is placed in position and inflated, and after this is done, the rim cannot be detached unless the stock be first released, and this can be accomplished only by releasing the lock by a person in possession of the key.

When employed in connection with a channel shaped felloe as shown in Figure 4, a clamp nut 24 will preferably be employed.

The improved device is simple in construction, can be inexpensively manufactured, effective in operation, and protects the rim from surreptitious detachment.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed is:—

The combination with a fastener having a head, of a cup shaped element surrounding the head and having an internal annular flange spaced from its free end, a lug formed on the element and adapted to engage a fixed part through which the fastener passes, a lock member detachably inserted in the element through its open end and having a reduced portion passing through said annular flange and adapted to engage beneath the same, and a removable cover cap threaded over and enclosing the element.

In testimony whereof, I affix my signature hereto.

WILLIAM V. SMITH.